United States Patent
Rajan

(10) Patent No.: US 11,068,826 B2
(45) Date of Patent: Jul. 20, 2021

(54) ENTERPRISE SKILLS DEVELOPMENT USING COGNITIVE COMPUTING

(71) Applicant: INTERNATIONAL BUSINESS MACHINES CORPORATION, Armonk, NY (US)

(72) Inventor: Upendra Rajan, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 789 days.

(21) Appl. No.: 14/838,592

(22) Filed: Aug. 28, 2015

(65) Prior Publication Data

US 2017/0061353 A1    Mar. 2, 2017

(51) Int. Cl.
*G06Q 10/00* (2012.01)
*G06Q 10/06* (2012.01)
*G06F 3/0481* (2013.01)
*G06F 3/0484* (2013.01)
*G06Q 10/10* (2012.01)

(52) U.S. Cl.
CPC ..... *G06Q 10/06393* (2013.01); *G06F 3/0481* (2013.01); *G06F 3/0484* (2013.01); *G06Q 10/06* (2013.01); *G06Q 10/10* (2013.01); *G06Q 10/105* (2013.01)

(58) Field of Classification Search
CPC ............ G06Q 10/06393; G06F 3/0481; G06F 3/0484
USPC ........................................................ 705/7.39
See application file for complete search history.

(56) References Cited

U.S. PATENT DOCUMENTS

| | | | |
|---|---|---|---|
| 5,724,987 A | 3/1998 | Gevins et al. | |
| 7,565,268 B2* | 7/2009 | Smith | G06Q 10/06 702/182 |
| 7,668,746 B2* | 2/2010 | Eisma | G06Q 10/105 705/7.14 |
| 8,548,843 B2* | 10/2013 | Folk | G06Q 10/06 705/7.38 |
| 2005/0026119 A1* | 2/2005 | Ellis | G06Q 10/105 434/219 |
| 2006/0166174 A1* | 7/2006 | Rowe | G09B 5/06 434/236 |
| 2009/0075246 A1 | 3/2009 | Stevens | |
| 2009/0276231 A1* | 11/2009 | Bazigos | G06Q 10/105 705/320 |
| 2010/0121685 A1* | 5/2010 | Mahadevan | G06Q 10/06 705/7.39 |
| 2012/0077160 A1 | 3/2012 | Degutis et al. | |

(Continued)

OTHER PUBLICATIONS

Anonymous, "Adaptable Content Retrieval for Cognitive Filtering of Sites and Content According to Job Role Skill Set Taxonomy", Jul. 5, 2012, An IP.com Prior Art Database Technical Disclosure; http://ip.com/IPCOM/000219548.

*Primary Examiner* — Hafiz A Kassim
*Assistant Examiner* — Tyrone E Singletary
(74) *Attorney, Agent, or Firm* — Griffiths & Seaton PLLC

(57) ABSTRACT

Various embodiments for enterprise skill development using cognitive computing, by a processor device, are provided. In one embodiment, a method comprises applying cognitive computing to analyze user data from an information system to identify a user's Enterprise Skills Index (ESI) of enterprise skills and skill-gaps by inputting and analyzing a plurality of indices for average achievement within the enterprise.

12 Claims, 3 Drawing Sheets

(56) References Cited

U.S. PATENT DOCUMENTS

2013/0177882 A1* 7/2013 Tharanathan ............ G09B 5/06
　　　　　　　　　　　　　　　　　　　　　434/219
2016/0012395 A1* 1/2016 Omar .................... G06Q 10/105
　　　　　　　　　　　　　　　　　　　　　705/320
2016/0078390 A1* 3/2016 Grewal ............ G06Q 10/06398
　　　　　　　　　　　　　　　　　　　　　705/7.42

* cited by examiner

ENTERPRISE SKILLS DEVELOPMENT USING COGNITIVE COMPUTING

BACKGROUND OF THE INVENTION

Field of the Invention

The present invention relates in general to computing systems, and more particularly, to various embodiments for personalized enterprise skills development using cognitive computing.

Description of the Related Art

The business enterprise environment is evolving at a rapid pace. Large companies and corporations often have the need to address a variety of factors weighing to workplace performance and efficiency. Some factors, including the fast paced technological advances in their respective industries, and an aging set of employees who may be falling behind in keeping up with these trends, may provide unique challenges in overall performance and efficiency. It's widely recognized in modern businesses that employee growth is one of the key contributors to transformation and success in any industry.

SUMMARY OF THE INVENTION

Various embodiments for enterprise skill development using cognitive computing, by a processor device, are provided. In one embodiment, a method comprises applying cognitive computing to analyze user data from an information system to identify a user's Enterprise Skills Index (ESI) of enterprise skills and skill-gaps by inputting and analyzing a plurality of indices for average achievement within the enterprise.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
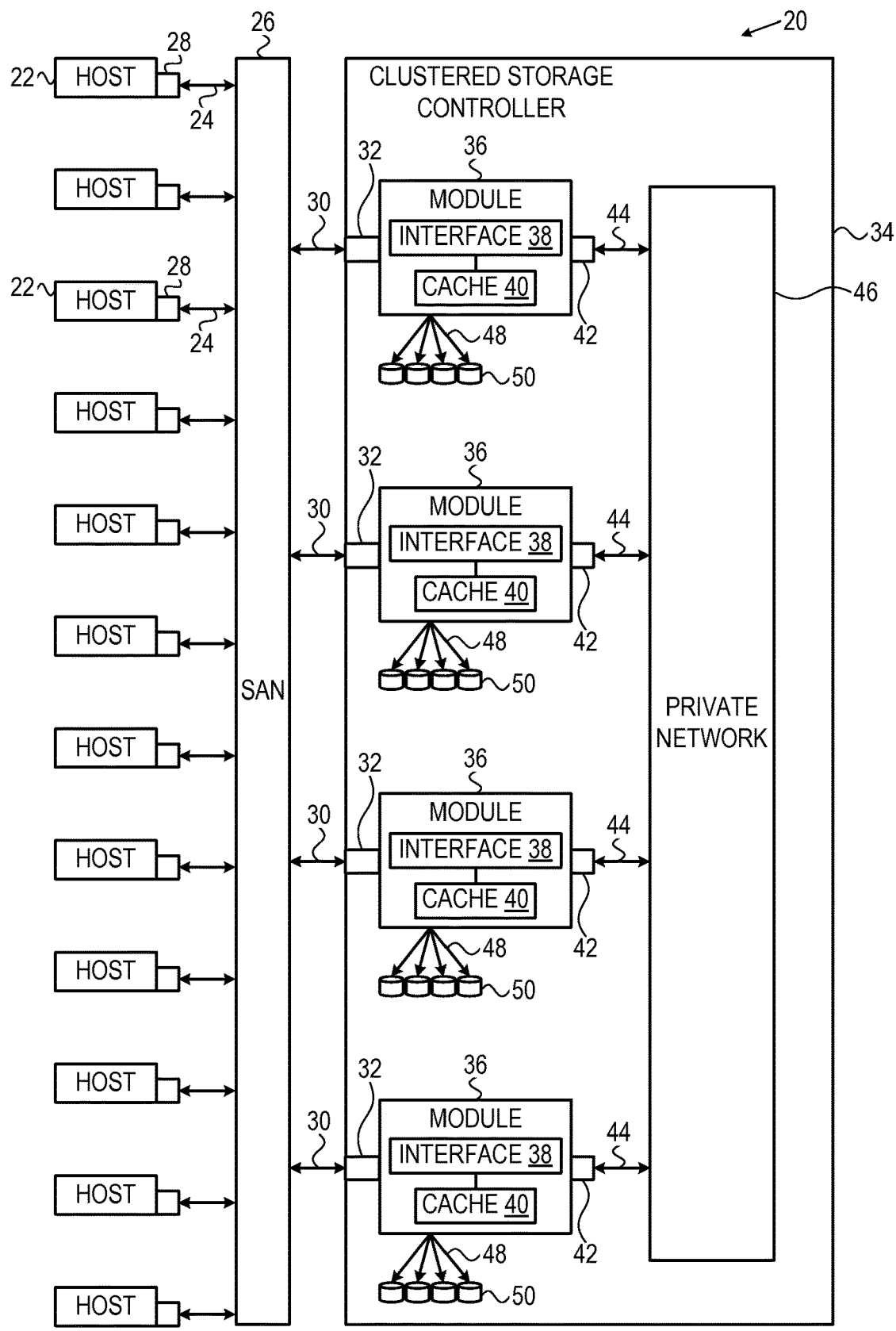
FIG. 1 illustrates a block diagram illustrating a computer storage environment in which aspects of the present invention may be realized.

Described embodiments, and illustrative Figures of various embodiments for personalized enterprise skills development using cognitive computing are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

As aforementioned, modern companies and corporations often have the need to address a variety of factors weighing to workplace performance and efficiency. Some factors, including the fast paced technological advances in their respective industries, and an aging set of employees who may be falling behind in keeping up with these trends, may provide unique challenges in overall performance and efficiency. It's widely recognized in modern businesses that employee growth is one of the key contributors to transformation and success in any industry.

One problem, therefore, is to identify and provide an evaluation of the current employee's standard of work, their gaps in keeping up with the industry trends, and to enable the employee with access to information that could benefit not only employee morale, but also the company and its efforts to stay relevant in a fast-paced industry.

Most companies recognize that individualized training is the need of the hour, owing to various disparate factors, such as educational qualifications, employee role, age, willingness to contribute, etc. A database of skills is also maintained in a sizeable enterprise. This data may be used by a sender as input to a cognitive system with a knowledge database across industries and workplaces. A cognitive system is capable of natural language input and analyzes individualized skills sets to identify the skills inside the enterprise, put them into perspective with indices, and to suggest modes of bridging these gaps, if the employee is willing to consider.

In view of the foregoing, the mechanisms of the illustrated embodiments provide various solutions to previous challenges for personalized enterprise skills development. These mechanisms include such functionality as using cognitive computing to analyze user data using an information system, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, a schematic pictorial illustration of a data processing storage subsystem 20 is shown, in accordance with a disclosed embodiment of the invention.

The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
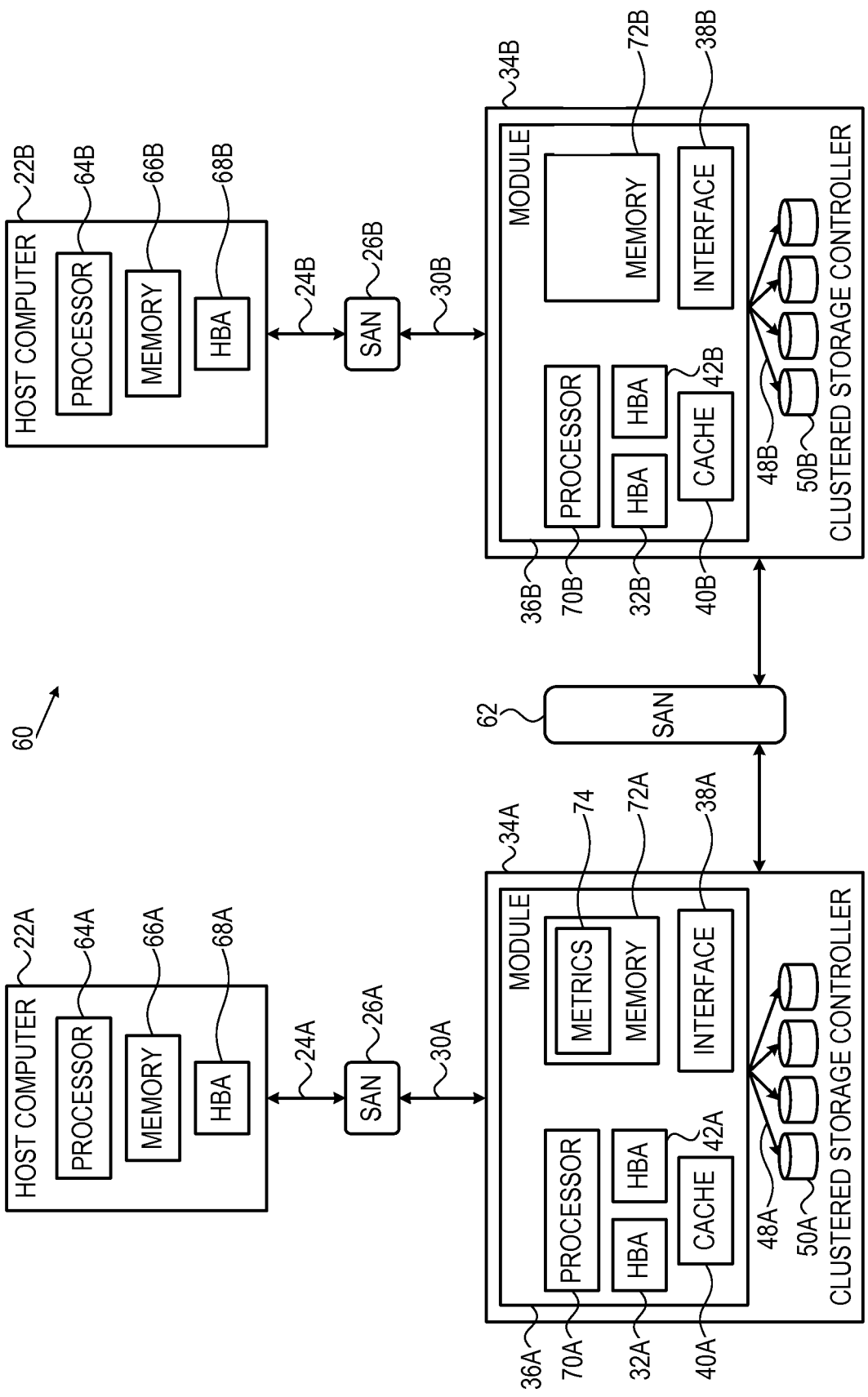
FIG. 2 illustrates a block diagram illustrating a hardware structure of an exemplary data storage system in a computer system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
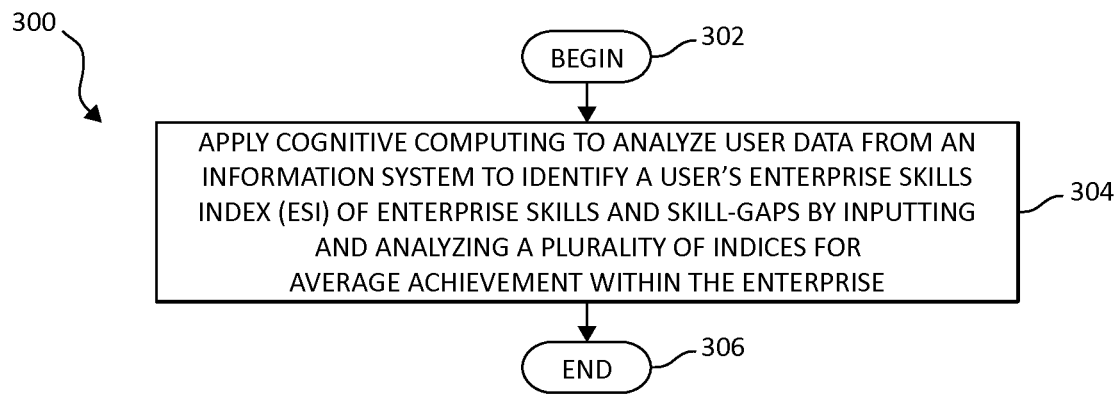
FIG. 3 illustrates a flow chart of a method for personalized enterprise skills development using cognitive computing.

Continuing to FIG. 3, a method for personalized enterprise skills development using cognitive computing 300 is illustrated, in accordance with one embodiment of the present invention. Starting at step 302, cognitive computing is applied to analyze user data from an information system to identify a user's Enterprise Skills Index (ESI) of enterprise skills and skill-gaps by inputting and analyzing a plurality of indices for average achievement within the enterprise (step 304). The method ends (step 306).

In one embodiment, using cognitive computing, an Enterprise Skills Index (ESI) may be obtained for an enterprise resource (employee/user) by measure of average achievement in key indices (pillars) of the resource: an estimate of years of experience remaining, current knowledge/skill set, desired skill set and a desire for skill growth. The ESI is a geometric mean of normalized indices for each of the four pillars.

As an example, the years of experience remaining may be assessed by the current age of the user as the minimum and 55 years as the maximum. The maximum of 55 is justified when taking into account the possibility of a user to shift elsewhere in today's highly competitive environment. The data for the desired skill set comes from a central information system used by an enterprise. The current skill set is determined by comparing the mean of the relevant skills of the user with the mean of the requisite skill index built by managers of the index. The user themselves provide the data for determining the desire for growth. This ranges from a minimum of zero, indicating no inclination for change, and a maximum often, indicating a high inclination to change. The mean score for these pillars act as an entry point for determining the scale of growth in a particular enterprise user.

The ESI of a user is not be used as a measure of job security, but provides a scope for determining the best pathways to bridge the skill gap in a fast changing environment. The broader goal is to stimulate interest and a sense of growth in the user, as well as provide a glimpse of relevant individualized pathways to attain a goal after analyzing the broad set of data that serves as the knowledge base for the cognitive system.

The mean of the ESI scores of individual users in an enterprise is the ESI of the enterprise as a whole. The ESI value may serve as an indicator of the quality of an enterprise's workforce. It is envisioned that the ESI score of an enterprise would serve as an effective way of comparing the quality of workforce of different enterprises of about the same size. For example, company A with an ESI of 8.2 (computed to a maximum value of 10, as an example) would quantitatively have a much more satisfied and mature (skill-wise) workforce than a company B with an ESI of 5 of 10. This provides a way for upper level managers to find and address gaps in their workforce iteratively over any period of time.

In one embodiment, the cognitive system takes data from the information system after it has been trained in using a knowledge database. The cognitive system then analyzes the data, breaks the user data into parts, generates hypotheses based on the input data and results of a search of knowledge database, performs evidence scoring based on a retrieval of evidence from database, performs synthesis of the hypotheses', and based on trained models, performs a final structuring and ranking with a measure of confidence indicated by a percentage score.

Figure 4:
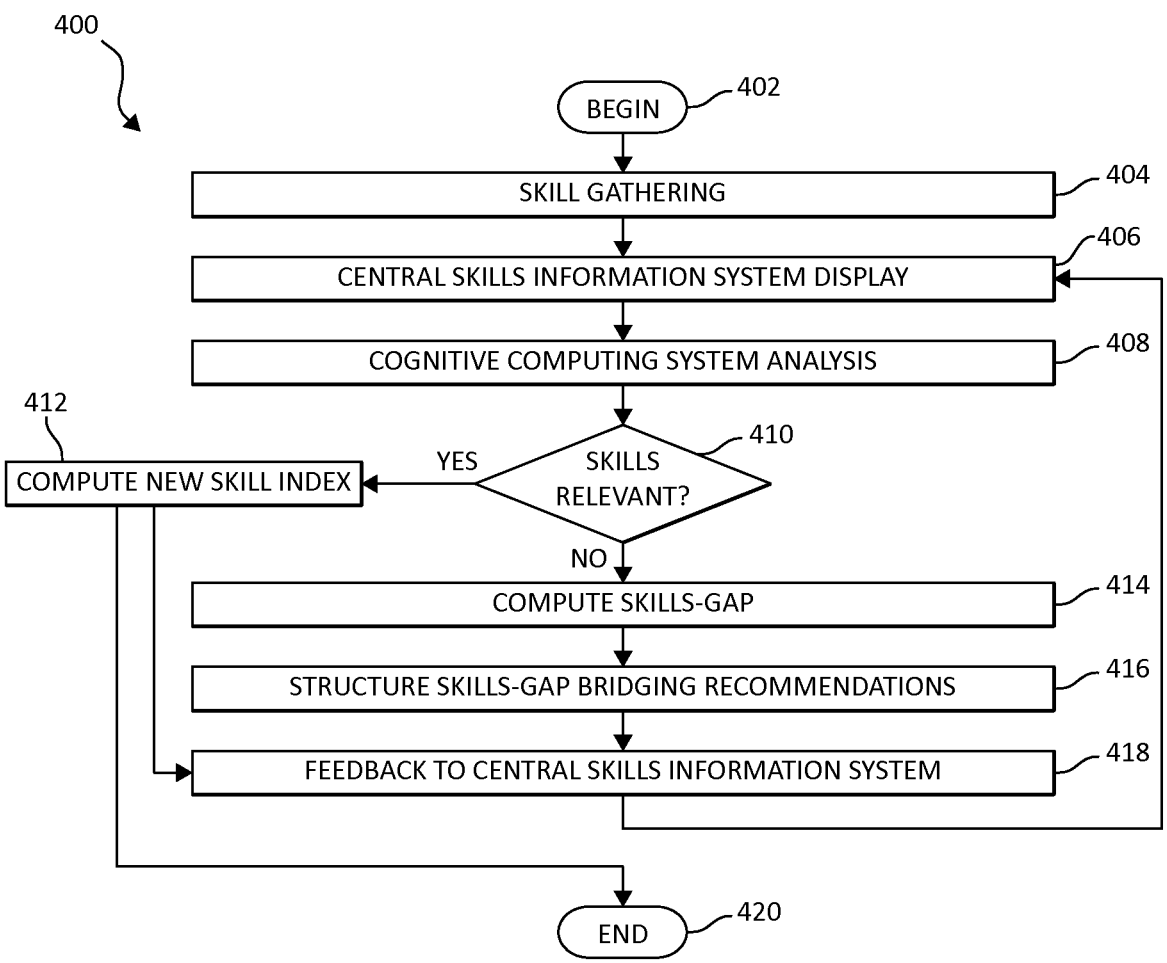
FIG. 4 illustrates an additional flow chart of a method for personalized enterprise skills development using cognitive computing.

Turning now to FIG. 4, a flow chart representing a method for personalized enterprise skills development 400 is illustrated, in accordance with one embodiment of the present invention. Starting at 402, a Skill Gathering phase 404 is initiated. The Skill Gathering phase 404 comprises inputting and specifying the custom skills required to manage a position in the enterprise successfully. This job is performed manually when the position is created and is customized based on current requirements and updated periodically. In other words, the Skill Gathering phase 404 comprises entering a set of skills relevant to a position that is made available to the bearer of the position inside the enterprise. The user then decides to understand the set of skills and determines the subset of skills that he possesses.

Continuing in the method 400 described in FIG. 4, the Central Skills Information System Display 406 is represented. This is a uniquely configured Central Information System, written in widely available programming languages. This system is based on traditional client-server architecture. The enterprise class database within this system is used to maintain user data, profile, and flags corresponding to the skill level of the resource, the set of which is predetermined at the Skill Gathering phase 404. The flags shall hold a variety of information corresponding to the ESI, over a scale of 1 to 10, with 10 being the highest. This system also serves as the front-end for the Cognitive Computing System Analysis 408. The information flow between the Central Skills Information System Display 406 and Cognitive Computing System Analysis 408 is automated at a time deemed suitable for the enterprise or as updates occur to the flags corresponding to the enterprise skill-set.

The Cognitive Computing System Analysis 408 is a cognitive system (such as IBM Watson) and receives input from the information system. However, during installation of the system, it is trained using sample datasets in using its knowledge database, which can be fed to the cognitive system as determined suitable by the enterprise. This knowledge database may come from the enterprise authorized training providers, or from a scan of relevant sources from the World Wide Web. This system, after data ingestion, analyzes the data using proprietary algorithms. The system scans input data, and generates hypotheses. A team may train the system using the sample data described above, to analyze mistakes and correct it if any. The cognitive system learns rapidly based on the input provided by its human correctors. It then continues its search of the knowledge database, performs evidence scoring based on a retrieval, performs synthesis of the hypotheses, and based on trained models, performs a final structuring and ranking with a measure of confidence indicated by a percentage score.

The Relevant Skills phase 410 is a function inside the cognitive system that compares the existing relevant skills obtained using the central information system, during the Skill Gathering phase 404, with a maximum score based analysis of its knowledge database for the same set of skills that the user has shown interest for. If the skills are deemed to be at the highest possible level, the system sends back a message to the user profile in the Skill Gathering phase 404, informing the user of their accomplishment. This is done, after computing a new ESI for the enterprise as a whole by Computing Skill Index 412. The Computing Skill Index 412 system also provides interaction with the Feedback to Central Skills Information System 418. If the skills are not deemed to be at the desired level at the Skills Relevant phase 410, the system proceeds to the next function to Compute the Skills-Gap 414 between the desired and the attained. The cognitive system, at this stage proceeds to measure its confidence scores, measures this with the relevant skills to identify the exact components that constitute the gap in skills. After a subset of the overall knowledge database is determined, henceforth called the relevant database, it proceeds with the next function, Structure Skills-Gap Bridging Recommendations 416. Structure Skills-Gap Bridging Recommendations 416 provides structured information that is determined by the cognitive system from the whole set of unstructured data in its knowledge database. The structured data template is provided in a manner that can be accessed using the relevant APIs.

The Feedback to Central Skills Information System 418 may be seen as the API of the cognitive system that facilitates transfer of the structured database determined in Structure Skills-Gap Bridging Recommendation 416. The API specifies how the cognitive system components should interact with the central information system, represented by the Skills Gathering phase 404, and is used when programming graphical user interface (GUI) component of the Skills Gathering phase 404. This facilitates the Skills Gathering phase 404 to be configured to the user or enterprise specifications, thus eliminating the front end interaction of the cognitive system. The hardware requirements for the cognitive computing system and the enterprise central skills information systems are determined and customized according to the needs of the enterprise. The method ends at 420.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for enterprise skill development using cognitive computing, by a processor device, comprising:
    applying, by the processor device, cognitive computing to analyze user data from an information system to identify a user's Enterprise Skills Index (ESI) of enterprise skills and skill-gaps by inputting and analyzing a plurality of indices for average achievement within the enterprise;
    prior to a performance of applying the cognitive computing analysis, training the information system, by the processor device, using a knowledge database, the knowledge database containing a collaborative input of unstructured user data, wherein the knowledge database is provided by an authorized enterprise training provider and contains sample datasets scanned as input for cognitive analysis according to a predetermined algorithm to provide output audited by human correctors; wherein the plurality of indices comprises a plurality of pillars; and wherein respective ones of the plurality of pillars comprise each of: an indication of an estimate of years of experience remaining; an indication of a current knowledge or skill set; an indication of a desired skill set; and an indication of a desire for skill growth;
    generating by the processor device, using the trained information system and without user input, a synthesis of hypotheses of causes of the identified skill-gaps based upon a comparison of the user data and information regarding a particular one of the enterprise skills gathered using the knowledge database to identify specific components that constitute the skill-gaps; wherein the skill-gaps are identified by comparing a mean of requisite skills for a particular job or position within the enterprise to a mean of skills of the user relevant to the particular job, wherein the synthesis of hypothesis comprise an amalgamation of the causes of the identified skill-gaps to identify the specific components that require user-attention to achieve the mean of requisite skills for the particular job or position, and wherein the information system uses natural language processing to consume information from multiple sources of the knowledge database, filters the information according to the cognitive computing analysis, generates the hypotheses based on the input of unstructured user data, and performs evidence scoring according to evidence supporting the hypothesis retrieved from the knowledge database to indicate a confidence ranking of the generated synthesis of hypotheses, the confidence ranking represented by a percentage score indicative of how confident the trained information system is that each of the specific components requiring user-attention are actually the causes of the identified skill-gaps; and
    in response to generating the synthesis of hypotheses, presenting on a display using an application programming interface (API), by the processor device, a structured data template containing recommendations to the user to bridge the identified skill-gaps so as to increase the user's ESI associated with the particular one of the enterprise skills; wherein the recommendations are ranked according to the confidence ranking of the generated synthesis of hypothesis.

2. The method of claim 1, further including analyzing a geometric mean of the plurality of pillars.

3. The method of claim 2, wherein the user's ESI is the geometric mean of average achievement of the user based upon information gathered using the plurality of pillars.

4. The method of claim 1, further including presenting the ESI as the percentage score.

5. A system for enterprise skill development using cognitive computing, comprising:
    a processor device executing instructions stored in a memory device, wherein the processor device:
        applies, by the processor device, cognitive computing to analyze user data from an information system to identify a user's Enterprise Skills Index (ESI) of enterprise skills and skill-gaps by inputting and analyzing a plurality of indices for average achievement within the enterprise;
        prior to a performance of applying the cognitive computing analysis, trains the information system, by the processor device, using a knowledge database, the knowledge database containing a collaborative input of unstructured user data, wherein the knowledge database is provided by an authorized enterprise training provider and contains sample datasets scanned as input for cognitive analysis according to a predetermined algorithm to provide output audited by human correctors; wherein the plurality of indices comprises a plurality of pillars; and wherein respective ones of the plurality of pillars comprise each of: an indication of an estimate of years of experience remaining; an indication of a current knowledge or skill set; an indication of a desired skill set; and an indication of a desire for skill growth;

generates by the processor device, using the trained information system and without user input, a synthesis of hypotheses of causes of the identified skill-gaps based upon a comparison of the user data and information regarding a particular one of the enterprise skills gathered using the knowledge database to identify specific components that constitute the skill-gaps; wherein the skill-gaps are identified by comparing a mean of requisite skills for a particular job or position within the enterprise to a mean of skills of the user relevant to the particular job, wherein the synthesis of hypothesis comprise an amalgamation of the causes of the identified skill-gaps to identify the specific components that require user-attention to achieve the mean of requisite skills for the particular job or position, and wherein the information system uses natural language processing to consume information from multiple sources of the knowledge database, filters the information according to the cognitive computing analysis, generates the hypotheses based on the input of unstructured user data, and performs evidence scoring according to evidence supporting the hypothesis retrieved from the knowledge database to indicate a confidence ranking of the generated synthesis of hypotheses, the confidence ranking represented by a percentage score indicative of how confident the trained information system is that each of the specific components requiring user-attention are actually the causes of the identified skill-gaps; and in response to generating the synthesis of hypotheses, presents on a display using an application programming interface (API), by the processor device, a structured data template containing recommendations to the user to bridge the identified skill-gaps so as to increase the user's ESI associated with the particular one of the enterprise skills; wherein the recommendations are ranked according to the confidence ranking of the generated synthesis of hypothesis.

6. The system of claim 5, wherein the processor device analyzes a geometric mean of the plurality of pillars.

7. The system of claim 6, wherein the user's ESI is the geometric mean of average achievement of the user based upon information gathered using the plurality of pillars.

8. The system of claim 5, wherein the processor device presents the ESI as the percentage score.

9. A computer program product for enterprise skill development using cognitive computing, by a processor device, the computer program product embodied on a non-transitory computer-readable storage medium having computer-readable program code portions stored therein, the computer-readable program code portions comprising:

a first executable portion that applies, by the processor device, cognitive computing to analyze user data from an information system to identify a user's Enterprise Skills Index (ESI) of enterprise skills and skill-gaps by inputting and analyzing a plurality of indices for average achievement within the enterprise;

a second executable portion that, prior to a performance of applying the cognitive computing analysis, trains the information system, by the processor device, using a knowledge database, the knowledge database containing a collaborative input of unstructured user data, wherein the knowledge database is provided by an authorized enterprise training provider and contains sample datasets scanned as input for cognitive analysis according to a predetermined algorithm to provide output audited by human correctors; wherein the plurality of indices comprises a plurality of pillars; and wherein respective ones of the plurality of pillars comprise each of: an indication of an estimate of years of experience remaining; an indication of a current knowledge or skill set; an indication of a desired skill set; and an indication of a desire for skill growth;

a third executable portion that generates by the processor device, using the trained information system and without user input, a synthesis of hypotheses of causes of the identified skill-gaps based upon a comparison of the user data and information regarding a particular one of the enterprise skills gathered using the knowledge database to identify specific components that constitute the skill-gaps; wherein the skill-gaps are identified by comparing a mean of requisite skills for a particular job or position within the enterprise to a mean of skills of the user relevant to the particular job, wherein the synthesis of hypothesis comprise an amalgamation of the causes of the identified skill-gaps to identify the specific components that require user-attention to achieve the mean of requisite skills for the particular job or position, and wherein the information system uses natural language processing to consume information from multiple sources of the knowledge database, filters the information according to the cognitive computing analysis, generates the hypotheses based on the input of unstructured user data, and performs evidence scoring according to evidence supporting the hypothesis retrieved from the knowledge database to indicate a confidence ranking of the generated synthesis of hypotheses, the confidence ranking represented by a percentage score indicative of how confident the trained information system is that each of the specific components requiring user-attention are actually the causes of the identified skill-gaps; and a fourth executable portion that, in response to generating the synthesis of hypotheses, presents on a display using an application programming interface (API), by the processor device, a structured data template containing recommendations to the user to bridge the identified skill-gaps so as to increase the user's ESI associated with the particular one of the enterprise skills; wherein the recommendations are ranked according to the confidence ranking of the generated synthesis of hypothesis.

10. The computer program product of claim 9, further including a fifth executable portion that analyzes a geometric mean of the plurality of pillars.

11. The computer program product of claim 10, wherein the user's ESI is the geometric mean of average achievement of the user based upon information gathered using the plurality of pillars.

12. The computer program product of claim 9, further including a fifth executable portion that presents the ESI as the percentage score.

\* \* \* \* \*